(12) United States Patent
Zhao et al.

(10) Patent No.: US 11,216,644 B2
(45) Date of Patent: Jan. 4, 2022

(54) METHOD, DEVICE, AND MEDIUM FOR PROCESSING IMAGE

(71) Applicant: Beijing Dajia Internet Information Technology Co., Ltd., Beijing (CN)

(72) Inventors: Songtao Zhao, Beijing (CN); Wen Zheng, Beijing (CN); Congli Song, Beijing (CN); Yilin Guo, Beijing (CN); Huijuan Huang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/031,420

(22) Filed: Sep. 24, 2020

(65) Prior Publication Data

US 2021/0004569 A1 Jan. 7, 2021

(30) Foreign Application Priority Data

Sep. 26, 2019 (CN) .......................... 201910918021.4

(51) Int. Cl.
*G06K 9/46* (2006.01)
*G06K 9/00* (2006.01)
*G06T 7/194* (2017.01)
*G06T 7/11* (2017.01)

(52) U.S. Cl.
CPC ..... *G06K 9/00248* (2013.01); *G06K 9/00281* (2013.01); *G06T 7/11* (2017.01); *G06T 7/194* (2017.01); *G06T 2207/20081* (2013.01); *G06T 2207/20084* (2013.01); *G06T 2207/30201* (2013.01)

(58) Field of Classification Search
CPC .. G06K 9/00; G06K 9/62; G06K 9/46; G06K 9/34; G06T 11/60; G06T 17/20; G06T 19/20; G06T 1/00; G06T 11/20; G06T 5/00; G06T 11/00; G06T 15/80; G06T 3/00; G06T 5/40; G06T 7/00; G06T 7/50; G06T 9/00; G06T 3/40; G06T 5/50; G06T 7/11; G06T 7/40; G06T 7/41; G06T 7/44; G06T 7/507; G06T 7/70; G06N 3/08; G06N 3/04; G06N 20/00; G06N 3/02; G06F 30/20; G06F 21/00
See application file for complete search history.

(56) References Cited

U.S. PATENT DOCUMENTS

| 2019/0014884 A1* | 1/2019 | Fu ......................... A45D 44/005 |
| 2020/0103980 A1* | 4/2020 | Katz ....................... G06F 3/167 |
| 2020/0327309 A1* | 10/2020 | Cheng .................. G06N 3/0445 |

* cited by examiner

*Primary Examiner* — Quan M Hua
(74) *Attorney, Agent, or Firm* — Knobbe, Martens, Olson & Bear, LLP

(57) ABSTRACT

The present disclosure relates to a method, a device and a medium for making up a face. The method for making up the face of the present disclosure includes: obtaining a first face image; determining facial key-points by detecting the first face image; generating a second face image by applying makeup to a face in the first face image based on the facial key-points; determining a first face region by segmenting the first face image, wherein the first face region is a face region that is not shielded in the first face image; and generating a final face makeup image with makeup based on the first face region and the second face image.

18 Claims, 4 Drawing Sheets

METHOD, DEVICE, AND MEDIUM FOR PROCESSING IMAGE

CROSS-REFERENCE TO RELATED APPLICATION

This application is based on and claims priority under 35 U.S.C 119 to Chinese Patent Application No. 201910918021.4, filed on Sep. 26, 2019, in the China National Intellectual Property Administration, the disclosures of which are herein incorporated by reference in its entirety.

FIELD

The present disclosure relates to the field of deep learning technology, and in particular, relates to a method, a device, and a medium for making up a face.

BACKGROUND

In common short video applications or camera applications currently, it is a common makeup technology to apply makeup (such as lipstick, eye shadow and blusher) to the face. This makeup technology is relatively mature and has been widely used in various scenarios.

However, the interference of shielding information cannot be avoided and the makeup cannot be applied to the face image in the electronic device in the above makeup technology which affects the user experience.

SUMMARY

The present disclosure provides a method, a device, and a medium for making up a face.

According to embodiments of the present disclosure, a method for making up a face is provided, including:
obtaining a first face image;
determining facial key-points by detecting the first face image;
generating a second face image by applying makeup to a face in the first face image based on the facial key-points;
determining a first face region by segmenting the first face image, wherein the first face region is a face region that is not shielded in the first face image; and
generating a third face image based on the first face region and the second face image.

According to embodiments of the present disclosure, an electronic device is provided, including:
a processor; and
a memory configured to store instructions executed by the processor;
wherein the processor is configured to execute the instructions to perform the method for making up the face according to the embodiments of the present disclosure.

According to embodiments of the present disclosure, a non-transitory computer-readable storage medium is provided and configured to store instructions which are executed by a processor of an electronic device to enable the electronic device to perform the method for making up the face according to the embodiments of the present disclosure.

BRIEF DESCRIPTION OF THE DRAWINGS

The drawings herein are incorporated into and constitute a part of the description, show embodiments conforming to the present disclosure, and are used to explain the principles of the present disclosure together with the description and do not constitute an undue limitation of the present disclosure.

DETAILED DESCRIPTION OF THE EMBODIMENTS

To make those of ordinary skill in the art better understand the technical solutions of the present disclosure, the technical solutions in the embodiments of the present disclosure will be described below clearly and completely in conjunction with the accompanying drawings.

It should be noted that the terms "first", "second" and the like in the description and claims of the present disclosure and the above-mentioned drawings are used for distinguishing similar objects, and do not need to be used for describing a specific order or sequence. It should be understood that data so used are interchangeable under appropriate circumstances so that the embodiments of the present disclosure described herein can be implemented in an order other than those illustrated or described herein. The implementation modes described in the following embodiments do not represent all implementation modes consistent with the present disclosure. Rather, they are merely examples of devices and methods consistent with some aspects of the present disclosure as detailed in the appended claims.

In common short video applications or camera applications currently, it is a common technique to apply makeup (such as lipstick, eye shadow and blusher) to the face Most common makeup solutions at present involve using key points of the face, such as key points in a lip region, to fit a corresponding curve and render makeup. These solutions are relatively mature and have been widely used in various scenarios.

Figure 1:
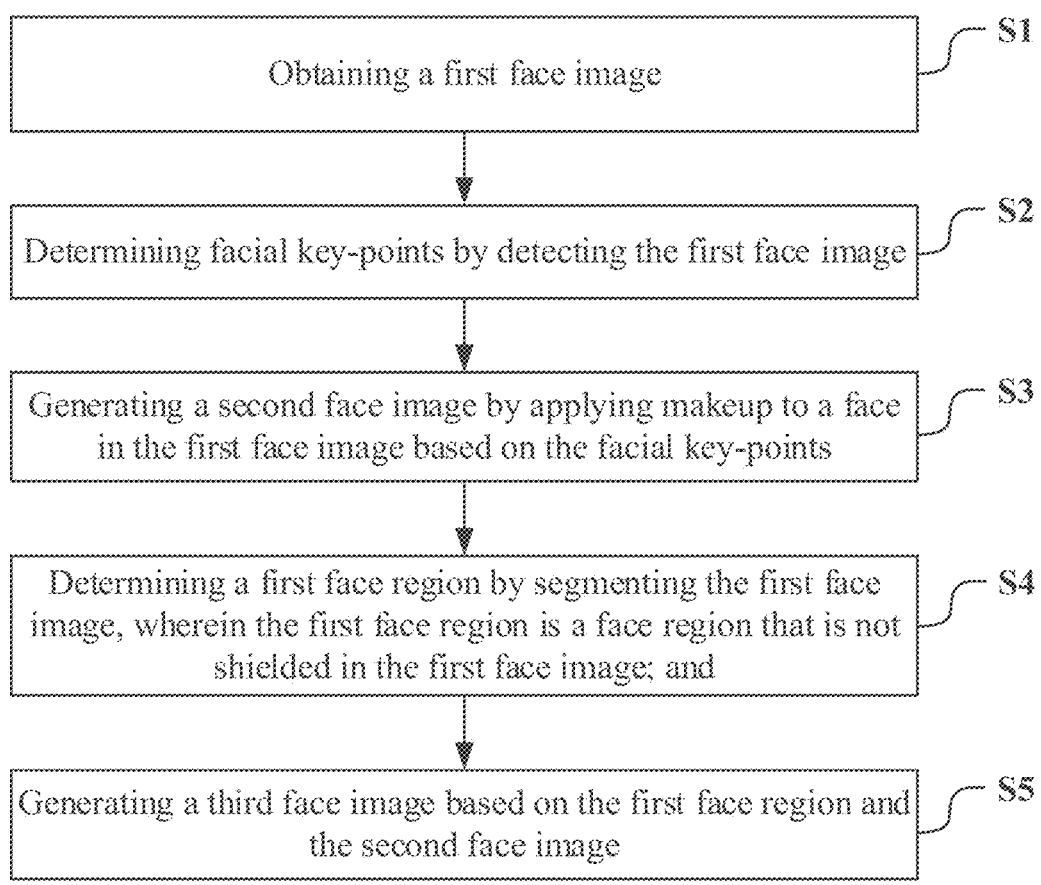
FIG. 1 is a schematic flow diagram of a method for making up a face shown according to an embodiment of the disclosure.

A method for making up a face according to the embodiment of the present disclosure as shown in FIG. 1 may be applied in an electronic device, such as a mobile phone, a tablet, a computer and a television. The specific technical solution of the method is performed as follows.

Step S1: obtaining a first face image.

Step S2: determining facial key-points by detecting the first face image.

Step S3: generating a second face image by applying makeup to a face in the first face image based on the facial key-points.

Figure 2:
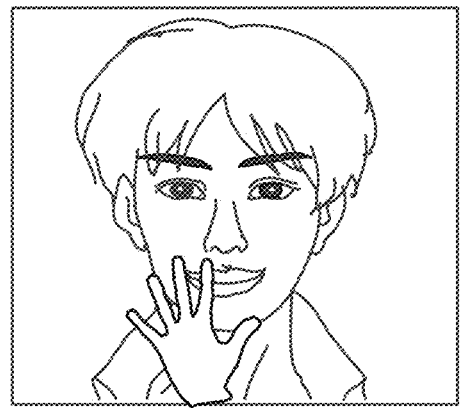
FIG. 2 is a schematic diagram of a face image shown according to an exemplary embodiment.
Figure 3:
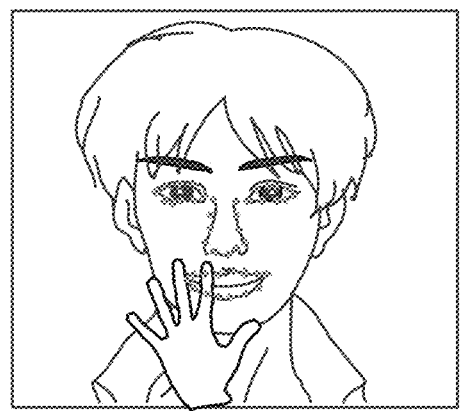
FIG. 3 is a schematic diagram of facial key-points shown according to an embodiment of the disclosure.
Figure 4:
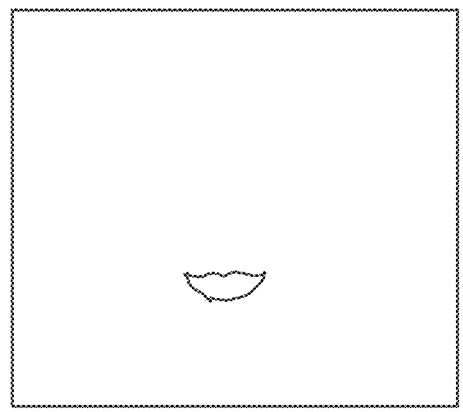
FIG. 4 is a schematic diagram of a fitted lip position shown according to an embodiment of the disclosure.
Figure 5:
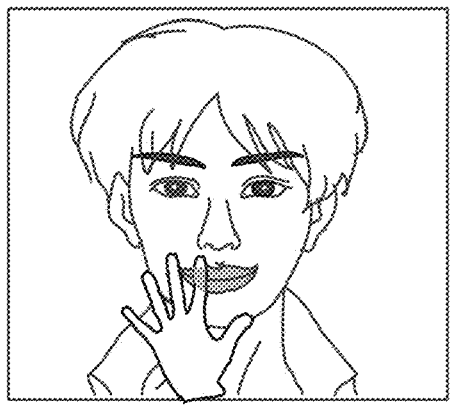
FIG. 5 is a schematic diagram of preliminary makeup shown according to an embodiment of the disclosure.

In some embodiments, an image is acquired, face detection is performed on the image, and the image is expanded according to a certain ratio based on a result of the face detection, to obtain a first face image containing the face as shown in FIG. 2. Of course, if an image does not contain a face, the image is not processed. Then, as shown in FIG. 3, facial key-point detection is performed on the first face image containing the face to obtain facial key-points, and a makeup is added to the first face image shown in FIG. 2 according to the facial key-points shown in FIG. 4 and pre-set face makeup region information. The second face image is an makeup-applied face image is shown in FIG. 5.

It should be noted that the preset part contains a face makeup mode and position information of the face makeup region. The face makeup mode is, for example, applying lip gloss to the lips of the face, or rendering eye shadow on the eyes of the face. The position information of the face makeup region is position information corresponding to the face makeup mode. For example, if a selected face makeup mode is applying lip gloss to the lips of the face, then the position information of the face makeup region is position information of key points of the lips.

Step S4: determining a first face region by segmenting the first face image, wherein the first face region is a face region that is not shielded in the first face image. In some embodiments, the first face region is determined by segmenting the first face image based on a semantic segmentation model, wherein the first face region is a region in the first face image other than a shielded region and a background region.

Figure 6:
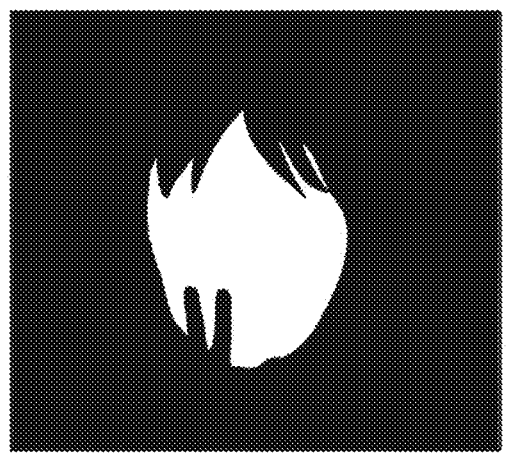
FIG. 6 is a schematic diagram of a semantic segmentation result of a face shown according to an embodiment of the disclosure.

In some embodiments, based on a semantic segmentation model obtained by training and the first face image, the semantic segmentation result, i.e., the first face region, as shown in FIG. 6, is the non-shielded face region. A shielding object and a background are both classified as non-face regions.

In some embodiments, the semantic segmentation model is obtained after training by a deep neural network model through the following steps.

Each of a plurality of training sample images is used as an input, the respective one semantic segmentation result output corresponding to each training sample image is compared with a labeled result of the respective one training sample image, and training is performed based on a difference between the semantic segmentation result output corresponding to each of the training sample images and the labeled result of the respective one training sample image, so that the difference between the semantic segmentation result output and the labeled result meets a requirement, wherein the semantic segmentation result corresponding to each training sample image is the non-shielded face region in each training sample image, and the labeled result is a semantic segmentation result labeled in the training sample images in advance. In the training to generate the semantic segmentation model, a machine learning algorithm, a convolutional neural network (CNN) algorithm or the like may be used, which is not limited in the embodiments of the present disclosure.

In some embodiments, the non-shielded face region is divided out by the detected facial key-points. For example, when the detected facial key-points in a left eye region of the face are less than a predetermined number, then the left eye region of the face is determined to be shielded.

In some embodiments, a mask image of face shielding information, as shown in FIG. 6 is obtained by setting a pixel value of the non-shielded face region in the semantic segmentation result to 1, and pixel values of other regions to 0.

Step S5: generating a third face image based on the first face region and the second face image.

In some embodiments, a shielded region and a non-shielded region in a makeup region in the second face image is determined based on the first face region; and the third face image is generated by remaining the makeup of the non-shielded region and removing the makeup of the shielded region.

Figure 7:
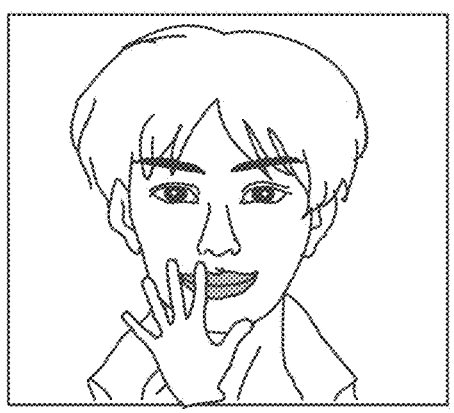
FIG. 7 is a schematic diagram of final makeup shown according to an embodiment of the disclosure.

In some embodiments, the makeup-applied face image as shown in FIG. 5 is corrected according to the semantic segmentation result shown in FIG. 6. Specifically in the correction, a first overlapping region between the makeup region and the non-shielded face region, and a second overlapping region between the makeup region and the shielded face region are determined, and then makeup in the second overlapping region in the makeup-applied face image is removed, while only retaining makeup in the first overlapping region in the makeup-applied face image, to obtain a final face makeup image with makeup as shown in FIG. 7.

In some embodiments, the mask image of the face shielding information is used to retain the makeup in the first overlapping region and remove the makeup in the second overlapping region.

Figure 8:
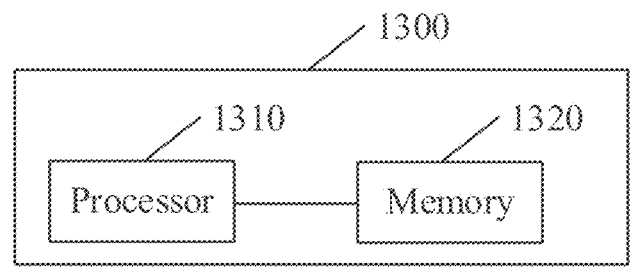
FIG. 8 is a schematic structural diagram of another device for making up a face shown according to an embodiment of the disclosure.

FIG. 8 is a block diagram of an electronic device 1300 shown according to the embodiments of the disclosure, including.

a processor 1310; and a memory 1320 for storing instructions executable by the processor 1310, wherein the processor 1310 is configured to execute the instructions to perform the method for making up the face in an embodiment of the present disclosure.

In some embodiments of the disclosure, the processor is configured to execute the instructions to:

obtain a first face image;

determine facial key-points by detecting the first face image;

generate a second face image by applying makeup to a face in the first face image based on the facial key-points;

determine a first face region by segmenting the first face image, wherein the first face region is a face region that is not shielded in the first face image, and generate a third face image based on the first face region and the second face image.

In some embodiments of the disclosure, the processor is further configured to execute the instructions to: determine a shielded region and a non-shielded region in a makeup region in the second face image based on the first face region; and generate the third face image, by remaining the makeup of the non-shielded region and removing the makeup of the shielded region.

In some embodiments of the disclosure, the processor is further configured to execute the instructions to: determine a first overlapping region where the makeup region overlaps with the first face region, and remaining the makeup of the first overlapping region; and determine a second overlapping region where the makeup region does not overlap with the first face region, and removing makeup in the second overlapping region.

In some embodiments of the disclosure, the processor is further configured to execute the instructions to determine the first face region, by segmenting the first face image based on a semantic segmentation model, wherein the first face region is a region in the first face image other than a shielded region and a background region.

In some embodiments of the disclosure, the semantic segmentation model is trained based on a difference between a labeled result and a semantic segmentation result; wherein the labeled result is a face region pre-labeled in training sample images, and the semantic segmentation result is a semantic segmentation result of segmenting each of the training sample images by the semantic segmentation model.

In some embodiments of the disclosure, the processor is further configured to execute the instructions to: obtain an image; determine a face region by recognizing a face in the image; and acquire the first face image based on the face region, wherein the first face image comprises the face region, and the area of the first face image is greater than that of the face region.

In some embodiments of the disclosure, a storage medium including one or more instructions, such as a memory 1320 including instructions, is also provided. The above-mentioned instructions may be executable by the processor 1310 of the device 1300 to perform the above-mentioned method. In some embodiments, the storage medium may be a non-transitory computer-readable storage medium. For example, the non-transitory computer-readable storage medium may be an ROM, a random access memory (RAM), a compact-disc read-only memory (CD-ROM), a magnetic tape, a floppy disk, an optical data storage device, or the like.

Figure 9:
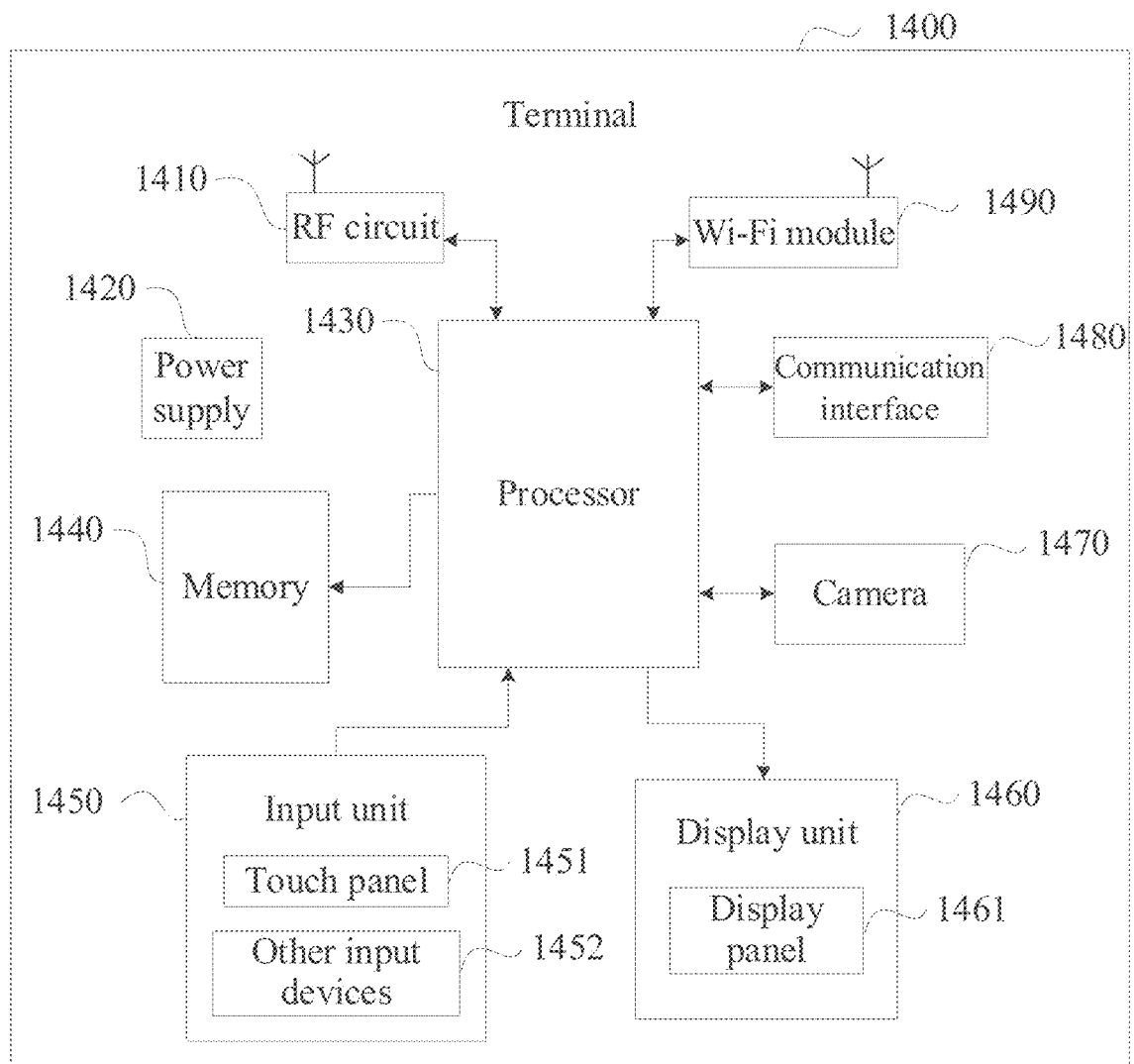
FIG. 9 is a schematic structural diagram of a terminal applying a method for making up a face shown according to an embodiment of the disclosure.

In an embodiment of the present disclosure, as shown in FIG. 9, the embodiment of the present disclosure provides a terminal 1400 applying the method for making up the face provided by an embodiment of the present disclosure, the terminal including the following components: a radio frequency (RF) circuit 1410, a power supply 1420, a processor 1430, a memory 1440, an input unit 1450, a display unit 1460, a camera 1470, a communication interface 1480, and a wireless fidelity (Wi-Fi) module 1490. Those skilled in the art may understand that the structure of the terminal shown in FIG. 9 is not a limitation on the terminal. The terminal provided by the embodiment of the present application may include more or less components than in the illustration, or involves a combination of some components, or a different component arrangement.

The components of the terminal 1400 are specifically introduced below in conjunction with FIG. 9.

The RF circuit 1410 may be used for data reception and transmission during communication or a call. Specifically, after receiving downlink data of a base station, the RF circuit 1410 transmits the data to the processor 1430 for processing, in addition, the circuit transmits uplink data to be transmitted to the base station. Generally, the RF circuit 1410 includes, but is not limited to, an antenna, at least one amplifier, a transceiver, a coupler, a low noise amplifier (LNA), a duplexer, or the like.

In addition, the RF circuit 1410 may also communicate with other terminals through wireless communication and a network. The wireless communication may use any communication standard or protocol, including but not limited to the global system of mobile communication (GSM), general packet radio service (GPRS), code division multiple access (CDMA), wideband code division multiple access (WCDMA), long term evolution (LTE), e-mail, short messaging service (SMS), etc.

The Wi-Fi technology is a short-distance wireless transmission technology. The terminal 1400 may be connected to an access point (AP) through the Wi-Fi module 1490, so as to achieve access to a data network. The Wi-Fi module 1490 may be used for receiving and transmitting data during communication.

The terminal 1400 may be physically connected with other terminals through the communication interface 1480. In some embodiments, the communication interface 1480 is connected with a communication interface of the other terminal through a cable to achieve data transmission between the terminal 1400 and the other terminal.

In the embodiment of the present application, the terminal 1400 can implement a communication service and send information to other contacts, so the terminal 1400 needs to have a data transmission function, that is, the terminal 1400 needs to include a communication module therein. Although FIG. 9 shows communication modules such as the RF circuit 1410, the Wi-Fi module 1490, and the communication interface 1480, it may be understood that in the terminal 1400, there is at least one of the above-mentioned components or other communication module (such as a Bluetooth module) for implementing communication to perform data transmission. For example, in the case where the terminal 1400 is a mobile phone, the terminal 1400 may include the RF circuit 1410, and may also include the Wi-Fi module 1490; in the case where the terminal 1400 is a computer, the terminal 1400 may include the communication interface 1480, and may also include the Wi-Fi module 1490; and in the case where the terminal 1400 is a tablet, the terminal 1400 may include the Wi-Fi module.

The memory 1440 may be used for storing software programs and modules. The processor 1430 executes various functional applications and data processing of the terminal 1400 by running the software programs and modules stored in the memory 1440, and after the processor 1430 executes program codes in the memory 1440, part or all of the processes in FIGS. 1 and 8 of embodiments of the present disclosure can be realized.

In some embodiments, the memory 1440 may mainly include a program storage area and a data storage area. The program storage area may store an operating system, various application programs (such as a communication application) and a face recognition module, etc. and the data storage area may store data created based on the use of the terminal (such as various pictures, video files and other multimedia files, and face information templates), etc.

In addition, the memory 1440 may include a high-speed random access memory, and may also include a non-volatile memory, such as at least one magnetic disk storage device, flash memory device, or other volatile solid-state storage devices.

The input unit 1450 may be used for receiving numerical or character information input by a user, and producing a key signal input related to user settings and functional control of the terminal 1400.

In some embodiments, the input unit 1450 may include a touch panel 1451 and other input terminals 1452.

The touch panel 1451, also known as a touch screen, may collect the user's touch operation thereon or in the vicinity thereof (for example, the user's operation on the touch panel 1451 or in the vicinity of the touch panel 1451 using any suitable object or accessory such as a finger or a stylus), and drive a corresponding connection device according to a preset program. In some embodiments, the touch panel 1451 may include two parts: a touch detection device and a touch controller. The touch detection device detects the user's touch orientation, and detects a signal brought by the touch operation, and transmits the signal to the touch controller; and the touch controller receives touch information from the touch detection device, converts the touch information into contact coordinates, and then transmits the contact coordinates to the processor 1430, and can receive a command sent by the processor 1430 and execute the command. In addition, the touch panel 1451 may be implemented in various forms such as resistance, capacitance, infrared, and surface acoustic waves.

In some embodiments, the other input terminal 1452 may include, but is not limited to one or more of a physical keyboard, a function key (such as a volume control key, and a switch key), a trackball, a mouse, and a joystick.

The display unit 1460 may be used for displaying information input by the user or information provided for the user and various menus of the terminal 1400. The display unit 1460 is a display system of the terminal 1400, and is used for presenting an interface to achieve human-machine interaction.

The display unit 1460 may include a display panel 1461. In some embodiments, the display panel 1461 may be configured in the form of a liquid crystal display (LCD), an organic light-emitting diode (OLED), or the like.

Further, the touch panel 1451 may cover the display panel 1461, and when the touch panel 1451 detects a touch operation thereon or in the vicinity thereof, a signal is transmitted to the processor 1430 to determine the type of touch event, and subsequently, the processor 1430 provides a corresponding visual output on the display panel 1461 according to the type of touch event.

Although in FIG. 9, the touch panel 1451 and the display panel 1461 are implemented as two independent components to achieve input and output functions of the terminal 1400, in some embodiments, the touch panel 1451 is integrated with the display panel 1461 to achieve the input and output functions of the terminal 1400.

The processor 1430 is a control center of the terminal 1400, is connected with various components by using various interfaces and lines, and performs various functions and data processing of the terminal 1400 by running or executing software programs and/or modules stored in the memory 1440 and calling data stored in the memory 1440, thereby implementing various services based on the terminal.

In some embodiments, the processor 1430 may include one or more processing units. In some embodiments, the processor 1430 may integrate an application processor and a modem processor, wherein the application processor mainly processes the operating system, a user interface, application programs and the like, and the modem processor mainly processes wireless communication. It may be understood that the above-mentioned modem processor may also not be integrated into the processor 1430.

The camera 1470 is used for implementing a photographic function of the terminal 1400 to photograph pictures or videos. The camera 1470 may also be used for implementing a scanning function of the terminal 1400 to scan a scanned object (two-dimensional code/bar code).

The terminal 1400 further includes a power supply 1420 (such as a battery) for supplying power to various components. In some embodiments, the power supply 1420 may be logically connected to the processor 1430 through a power management system, to achieve functions of managing charging, discharging, power consumption and the like through the power management system.

It should be noted that the processor 1430 in the embodiment of the present disclosure may perform the functions of the processor 1310 in FIG. 8, and the memory 1440 stores contents in the processor 1310.

In addition, in some embodiments of the disclosure, the present disclosure further provides a storage medium, configured to store instructions which are executed by the processor of the above-mentioned device for making up the face to enable the above-mentioned device for making up the face to execute the method for making up the face in the embodiments of the present disclosure.

After considering the description and practicing the invention disclosed herein, those skilled in the art will readily conceive of other embodiments of the present disclosure. The present application is intended to cover any variations, uses or adaptive changes of the present disclosure, and these variations, uses or adaptive changes follow the general principles of the present disclosure and include common general knowledge or customary technical means in the technical field not disclosed in the present disclosure. The description and embodiments are regarded as exemplary only, and the true scope and spirit of the present disclosure are indicated by the following claims.

It should be understood that the present disclosure is not limited to the precise structure already described above and shown in the drawings, and various modifications and changes can be made thereto without departing from the scope thereof. The scope of the present disclosure is defined only by the appended claims.

What is claimed is:

1. A method for processing an image, comprising:
   obtaining a first face image,
   determining facial key-points by detecting the first face image;
   generating a second face image by applying makeup to a face in the first face image based on the facial key-points;
   determining a first face region by segmenting the first face image, wherein the first face region is a face region that is not shielded in the first face image; and
   generating a third face image based on the first face region and the second face image.

2. The method according to claim 1, wherein said generating the third face image comprises:
   determining a shielded region and a non-shielded region in a makeup region in the second face image based on the first face region; and
   generating the third face image, by remaining the makeup of the non-shielded region and removing the makeup of the shielded region.

3. The method according to claim 2, further comprising:
   determining a first overlapping region where the makeup region overlaps with the first face region, and remaining the makeup of the first overlapping region; and
   determining a second overlapping region where the makeup region does not overlap with the first face region, and removing makeup in the second overlapping region.

4. The method according to claim 1, wherein said determining the first face region comprises:
   determining the first face region by segmenting the first face image based on a semantic segmentation model, wherein the first face region is a region in the first face image other than a shielded region and a background region.

5. The method according to claim 4, wherein the semantic segmentation model is trained based on a difference between a labeled result and a semantic segmentation result; wherein the labeled result is a face region pre-labeled in training sample images, and the semantic segmentation result is a semantic segmentation result of segmenting each of the training sample images by the semantic segmentation model.

6. The method according to claim 1, wherein said obtaining the first face image comprising:

obtaining an image;
determining a face region by recognizing a face in the image; and
acquiring the first face image based on the face region, wherein the first face image comprises the face region, and the area of the first face image is greater than that of the face region.

7. An electronic device, comprising:
a processor; and
a memory configured to store instructions executed by the processor,
wherein the processor is configured to execute the instructions to:
obtain a first face image;
determine facial key-points by detecting the first face image;
generate a second face image by applying makeup to a face in the first face image based on the facial key-points;
determine a first face region by segmenting the first face image, wherein the first face region is a face region that is not shielded in the first face image; and
generate a third face image based on the first face region and the second face image.

8. The electronic device according to claim 7, wherein the processor is further configured to execute the instructions to:
determine a shielded region and a non-shielded region in a makeup region in the second face image based on the first face region; and
generate the third face image, by remaining the makeup of the non-shielded region and removing the makeup of the shielded region.

9. The electronic device according to claim 8, wherein the processor is further configured to execute the instructions to:
determine a first overlapping region where the makeup region overlaps with the first face region, and remaining the makeup of the first overlapping region; and
determine a second overlapping region where the makeup region does not overlap with the first face region, and removing makeup in the second overlapping region.

10. The electronic device according to claim 7, wherein the processor is further configured to execute the instructions to:
determine the first face region, by segmenting the first face image based on a semantic segmentation model, wherein the first face region is a region in the first face image other than a shielded region and a background region.

11. The electronic device according to claim 10, wherein the semantic segmentation model is trained based on a difference between a labeled result and a semantic segmentation result; wherein the labeled result is a face region pre-labeled in training sample images, and the semantic segmentation result is a semantic segmentation result of segmenting each of the training sample images by the semantic segmentation model.

12. The electronic device according to claim 7, wherein the processor is further configured to execute the instructions to:
obtain an image;
determine a face region by recognizing a face in the image; and
acquire the first face image based on the face region, wherein the first face image comprises the face region, and the area of the first face image is greater than that of the face region.

13. A non-transitory computer-readable storage medium, configured to store instructions which are executed by a processor of an electronic device to enable the electronic device to:
obtain a first face image;
determine facial key-points by detecting the first face image;
generate a second face image by applying makeup to a face in the first face image based on the facial key-points;
determine a first face region by segmenting the first face image, wherein the first face region is a face region that is not shielded in the first face image; and
generate a third face image based on the first face region and the second face image.

14. The non-transitory computer-readable storage medium according to claim 13, wherein the non-transitory computer-readable storage medium is further configured to enable the electronic device to:
determine a shielded region and a non-shielded region in a makeup region in the second face image based on the first face region; and
generate the third face image, by remaining the makeup of the non-shielded region and removing the makeup of the shielded region.

15. The non-transitory computer-readable storage medium according to claim 14, wherein the processor is further configured to execute the instructions to:
determine a first overlapping region where the makeup region overlaps with the first face region, and remaining the makeup of the first overlapping region; and
determine a second overlapping region where the makeup region does not overlap with the first face region, and removing makeup in the second overlapping region.

16. The non-transitory computer-readable storage medium according to claim 13, wherein the non-transitory computer-readable storage medium is further configured to enable the electronic device to:
determine the first face region, by segmenting the first face image based on a semantic segmentation model, wherein the first face region is a region in the first face image other than a shielded region and a background region.

17. The non-transitory computer-readable storage medium according to claim 16, wherein the semantic segmentation model is trained based on a difference between a labeled result and a semantic segmentation result: wherein the labeled result is a face region pre-labeled in training sample images, and the semantic segmentation result is a semantic segmentation result of segmenting each of the training sample images by the semantic segmentation model.

18. The non-transitory computer-readable storage medium according to claim 13, wherein the non-transitory computer-readable storage medium is further configured to enable the electronic device to:
obtain an image;
determine a face region by recognizing a face in the image; and
acquire the first face image based on the face region, wherein the first face image comprises the face region, and the area of the first face image is greater than that of the face region.

* * * * *